Dec. 28, 1954     J. D. HASKELL     2,697,851
METHOD AND APPARATUS FOR TREATING PLASTIC WEB
Filed March 24, 1951
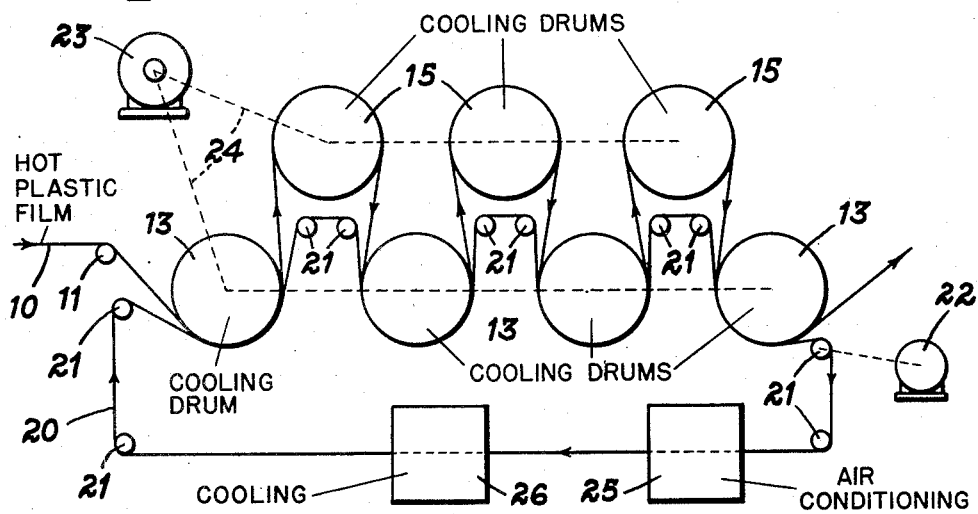
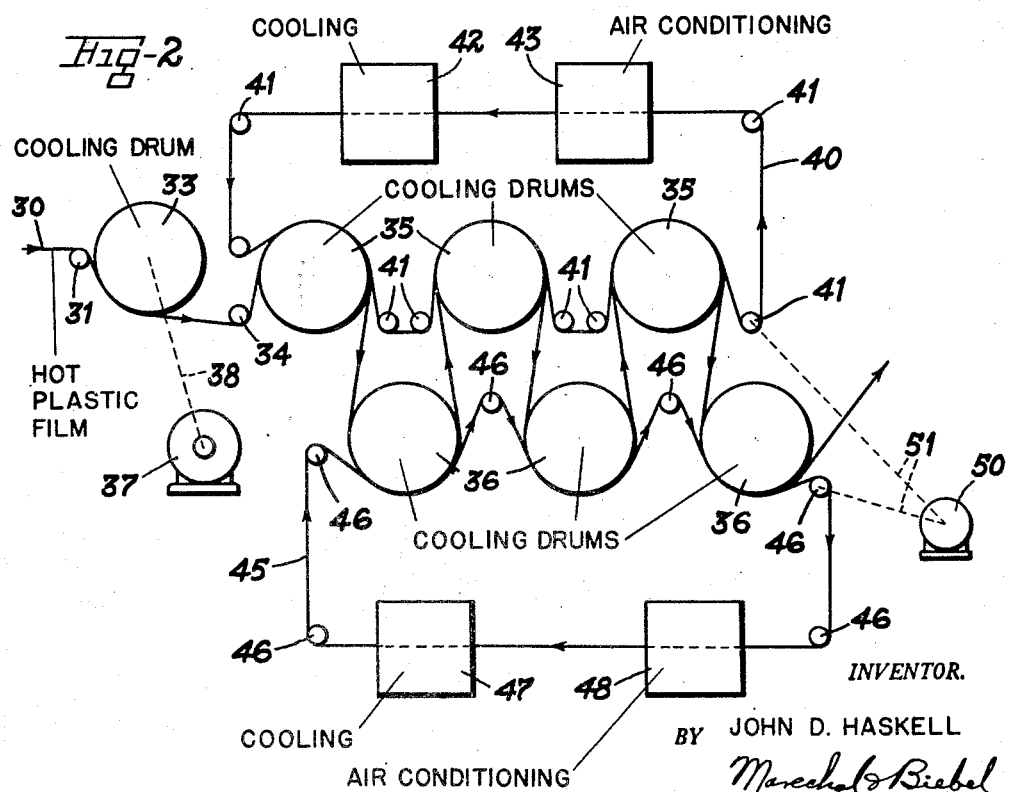
INVENTOR.
BY JOHN D. HASKELL
ATTORNEYS United States Patent Office 2,697,851
Patented Dec. 28, 1954

2,697,851

METHOD AND APPARATUS FOR TREATING PLASTIC WEB

John D. Haskell, Fulton, N. Y., assignor to The Black-Clawson Company, Hamilton, Ohio, a corporation of Ohio Application March 24, 1951, Serial No. 217,329

8 Claims. (Cl. 18—1)

This invention relates to the manufacture of plastic film materials and more particularly to the cooling of freshly formed hot plastic film or web.

One of the principal objects of the invention is to provide apparatus and a method for treating freshly extruded or otherwise formed hot plastic film to cool the film under accurately controlled conditions of temperature and humidity while avoiding accumulation of moisture thereon tending to detract from the desired uniform surface characteristics of the film.

In accordance with the invention, the freshly formed hot film is caused to pass over a series of cooling drums to effect gradual cooling of the film by contact with the cooled drum faces, and a continuous belt or web substantially equal in width to the drum faces is arranged to press the film between itself and the drum over a substantial portion of the total drum surface in contact with the film. Uniform pressure contact of the film with the drums is thus assured, and also the deposit of moisture on the exposed surface of the film is effectively prevented. Further accuracy of control over the conditions of cooling is obtained by causing the continuous belt to pass through curing or humidification chambers or cooling chambers as desired, and also improved simplicity of construction and operation is obtained by employing a direct drive for the belt and maintaining the belt under sufficient tension to cause it to drive the cooling drums, thus avoiding mechanical drive connections to the several drums.

It is accordingly another object of the invention to provide apparatus and a method for treating freshly formed hot plastic films in which the hot film is progressively guided over and pressed against a plurality of cooling surfaces such as cooled drums by means of a continuous belt or web, and in which the belt is continuously treated to maintain substantially constant conditions of temperature and/or humidity therein and thereby to promote more rapid and more accurately controlled cooling of the film as well as to improve the surface characteristics of the film.

Other objects and advantages of the invention will be apparent from the following description, the accompanying drawing and the appended claims.

In the drawing—

Fig. 1 is a diagrammatic view illustrating an arrangement of apparatus in accordance with the invention for practicing the method of the invention to cool freshly formed hot plastic film; and Fig. 2 is a view similar to Fig. 1 showing another arrangement of apparatus in accordance with the invention in which a plurality of continuous belts are used.

Referring to the drawing, which illustrates preferred embodiments of the invention, in Fig. 1 the hot plastic film 10 is represented as coming directly from a calender or extrusion apparatus by which it is formed, and the hot film 10 is guided by an idler roll 11 to and around the first of a row of cooling drums 13 arranged in staggered and offset relation with a second set of cooling drums 15, with the web being threaded alternately around the drums in each set in turn as shown to bring each surface thereof alternately into engagement with one of the drums. Each of these drums is maintained at a desired cooling temperature by circulating water or other suitable coolant therethrough, and preferably the temperature of the indivdual drums varies progressively in the order in which they are engaged by the web to effect gradual cooling of the film before it passes to a winder or to an embosser or other converting equipment as desired.

A continuous belt or web 20 is supported by a series of guide rolls 21 in such manner as to pass over and partly around each of the cooling drums 13. This belt 20 is substantially equal in width to the face of the cooling drums, and the guide rolls 21 are arranged to maintain sufficient tension in belt 20 to cause it to press with moderate pressure against the surfaces of the drums and thus to hold film 10 in uniformly close engagement with the drums. A drive motor 22 may be provided as indicated to drive one of the guide rolls 21 and thus to maintain the continuous advancing movement of belt 20 at a rate properly correlated with the movement of the film 10. Also, the belt 20 and motor 22 may be employed to drive the drums 13, through pressure engagement of the belt with the faces of the drums, or the drums may be provided with a separate motor 23 and mechanical drive as indicated at 24 properly correlated with the rate of formation of the film 10.

The belt 20 is selected and treated in accordance with the nature of the particular plastic film being produced and the surface characteristics desired thereon to promote cooling of the film under accurately controlled conditions and especially to prevent damage to the surface of the film during cooling. Thus for example, if there is a tendency with the particular plastic film being produced for drops of moisture to accumulate on the film surface, the belt 20 may be a woven fabric, such as cotton, wool nylon or spun glass, which is adapted to take up such moisture from the film, and this moisture may be continuously removed by passing the belt through a conditioning chamber 25 spaced from the drums 13. Also, improved cooling and control over the cooling conditions are obtained by employing a material in belt 20 which is adapted to take up heat from the film, and a cooling chamber 26 is also provided adjacent the conditioning chamber 25 for continuously cooling the belt to maintain its temperature within a desired range.

If under some conditions it is found that desirable acceleration of the cooling of the hot plastic film is effected by maintaining the belt 20 moist, the belt may be formed as above of a suitable woven fabric, and a controlled amount of moisture may be added in the chamber 25. It should also be understood that the invention is not limited to the use of a fabric belt, and that metal belts, such for example as stainless steel, may be found useful for plastic films of some materials and types. In any case, continuous reconditioning of the belt in accordance with the invention to maintain desired temperature and/or humidity conditions therein offers substantial practical advantages both in accelerating the cooling operation and in improving the quality of the product.

Fig. 2 shows a further arrangement of apparatus in accordance with the invention in which a plurality of continuous belts are used. In Fig. 2, the hot plastic film 30 is shown as guided by an idler roll 31 over an initial cooling drum 33 and then around a second idler 34 to the first of a series of drums 35 arranged in staggered and offset relation with a second plurality of cooling drums 36. The initial cooling drum is shown as driven by a motor 37 through a mechanical drive connection indicated diagrammatically at 38.

The endless belt 40 is supported on a series of guide rolls 41 in such manner as to pass over and partly around each of the cooling rolls 35 and is provided with cooling and conditioning chambers 42 and 43 respectively. A second continuous belt 45 is similarly supported on a series of guide rolls 46 and passes over and partly around each of the cooling rolls 36, and the belt 45 is provided with cooling and conditioning chambers 47 and 48 respectively. The two belts are shown as driven by a common motor 50 through mechanical drive connections 51 to one of each of the sets of guide rolls 41 and 46 respectively.

This arrangement shown in Fig. 2 has the advantage that substantially the entire portion of the film 30 in contact with any of drums 35 and 36 at a given instant will be under pressure from one or the other of belts 40 and 45 for accurately controlled cooling, and it will be apparent that if desired, the belt 45 may be extended into engagement also with the initial cooling drum 32 in substantially the same manner as shown in Fig. 1 for the belt 20 and the first cooling drum 13. Furthermore, since the alternate threading of the film around the drums places first one and then the other surface of the film into contact with a drum, the surface of the film which would otherwise be exposed is in each case covered by one of the belts for accelerated controlled cooling. The arrangement of Fig. 2 also provides flexibility and simplicity in the drive, since if desired, the belts 40 and 45 may be maintained under sufficient tension to drive the drums 35 and 36 without requiring a separate drive connection for these drums, although such separate drive connections may be provided from the motor 37 in a manner similar to that shown in Fig. 1.

It will thus be seen that the method of the invention and the apparatus for carrying it into effect offer substantial advantages from the standpoint of accurate control of the cooling conditions for a freshly formed hot plastic film with relatively simple structural requirements. Thus with both surfaces of the plastic film in contact with a cooling member at the same time, the total interval required for cooling, and hence the number of drums required, may be materially reduced for a given set of conditions. Also, with the cooling belt selected and continuously reconditioned as described in accordance with the particular characteristics of the plastic film under treatment, accelerated cooling and improved uniformity of the surface characteristics of the film can be obtained.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. The method of treating hot freshly formed plastic film to cool said film without the use of a cooling bath which includes the steps of guiding said hot film in alternating relation around a plurality of cylindrically curved cooling surfaces to present opposite sides of said film to successive said surfaces, guiding around the same sides of alternate said surfaces as said film an endless belt at least substantially equal to said film in width and adapted to absorb heat from said film, maintaining tension in said belt to retain said belt and said alternate surfaces in heat exchanging contact with said film while separating said belt from said film intermediate said alternate surfaces to provide for passage of said film around the other said surfaces in separate relation with said belt, continuously advancing both said belt and said film, and continuously cooling said belt at a position spaced from said cooling surfaces to increase the heat absorbing action thereof with respect to said film.

2. The method of treating hot freshly formed plastic film to cool said film without the use of a cooling bath which includes the steps of guiding said hot film in alternating relation around a plurality of cylindrically curved cooling surfaces to present opposite sides of said film to successive said surfaces, guiding around the same sides of alternate said surfaces as said film an endless belt at least substantially equal to said film in width and adapted to absorb heat from said film, maintaining tension in said belt to retain said belt and said alternate surfaces in heat exchanging contact with said film while separating said belt from said film intermediate said alternate surfaces to provide for passage of said film around the other said surfaces in separate relation with said belt, continuously advancing both said belt and said film, and continuously reconditioning said belt at a position spaced from said cooling surfaces to maintain predetermined temperature and humidity conditions in said belt increasing the heat absorbing action thereof with respect to said film.

3. The method of treating hot freshly formed plastic film to cool said film without the use of a cooling bath which includes the steps of guiding said film over alternate curved cooling surfaces of a substantial area in a plurality of said surfaces a first endless belt at least substantially equal in width to said film and adapted to absorb heat from said film, guiding over the other said surfaces in said plurality thereof a second endless belt at least substantially equal in width to said film and adapted to absorb heat from said film, threading said hot film between said belts and said surfaces in succession to bring opposite sides of said film in alternating relation to said successive said surfaces, maintaining tension in both said belts to retain said belts and said surfaces in heat exchanging contact with said film, continuously advancing both said belts and said film, and continuously cooling said belts to increase the heat absorbing action thereof with respect to said film.

4. Apparatus for treating hot freshly formed plastic film to cool said film without the use of a cooling bath with improved surface characteristics thereon, comprising a plurality of cooling drum of substantial diameter arranged in spaced relation to receive said hot film thereover, a continuous belt substantially equal in width to the face of said drums and adapted to absorb heat from said film, means for guiding said hot film and said belt around the same sides of alternate said drums and for separating said film and said belt intermediate said alternate drums while guiding said film around the other said drums to present opposite sides of said film for contact with successive said drums and to maintain said belt and said alternate drums in heat exchanging contact with opposite surfaces of said film, means for maintaining both said belt and said film in continuous motion, and means spaced from said drums for continuously cooling said belt to increase the heat absorbing action thereof with respect to said film.

5. Apparatus for treating hot freshly formed plastic film to cool said film without the use of a cooling bath with improved surface characteristics thereon, comprising a plurality of cooling drums of substantial diameter arranged in spaced relation to receive said hot film thereover, a continuous belt substantially equal in width to the face of said drums and adapted to absorb heat from said film, means for guiding said hot film and said belt around the same sides of alternate said drums and for separating said film and said belt intermediate said alternate drums while guiding said film around the other said drums to present opposite sides of said film for contact with successive said drums and to maintain said belt and said alternate drums in heat exchanging contact with opposite surfaces of said film, means for maintaining both said belt and said film in continuous motion, and means spaced from said drums for continuously reconditioning said belt to maintain predetermined temperature and humidity conditions therein increasing the heat absorbing action thereof with respect to said film.

6. Apparatus for treating hot freshly formed plastic film to cool said film without the use of a cooling bath with improved surface characteristics thereon, comprising a plurality of cooling drums of substantial diameter arranged in spaced relation to receive said hot film thereover, a continuous belt substantially equal in width to the face of said drums and adapted to absorb heat from said film, means for guiding said hot film and said belt around the same sides of alternate said drums and for separating said film and said belt intermediate said alternate drums while guiding said film around the other said drums to present opposite sides of said film for contact with successive said drums and to maintain said belt and said alternate drums in heat exchanging contact with opposite surfaces of said film, means for continuously advancing said belt while maintaining said belt in said pressure engagement with said drums to effect rotation of said drums and continuous motion of said film at substantially the same speed as said belt, cooling means for said belt spaced from said drums, and means for continuously guiding said belt in heat exchanging relation with said cooling means to maintain predetermined temperature conditions in said belt increasing the heat absorbing action thereof with respect to said film.

7. Apparatus for treating hot freshly formed plastic film to cool said film without the use of a cooling bath while maintaining uniform surface characteristics thereon, comprising a first group of cooling drums of substantial diameter adapted to receive said hot film thereover, a second group of cooling drums of substantial diameter arranged in staggered and offset relation with said first group of drums, means for guiding said hot film around the drums in both said groups thereof in alternating relation to present opposite sides of said film to successive said drums, a pair of endless belts substantially equal in width to the face of said drums and adapted to absorb heat from said film, means for guiding one of said belts over one of said groups of drums, means for guiding the other said belt over the other said group of drums, means tensioning said belts to support said belts in pressure engagement with said film against said drums maintaining said belts and said drums in heat exchanging contact with opposite surfaces of said film, means for continuously advancing both said belts and said film, and means spaced from said drums for continuously cooling said belts to increase the heat absorbing action thereof with respect to said film.

8. Apparatus for treating hot freshly formed plastic film to cool said film without the use of a cooling bath while maintaining uniform surface characteristics thereon, comprising a first group of cooling drums of substantial diameter adapted to receive said hot film thereover, a second group of cooling drums of substantial diameter arranged in staggered and offset relation with said first group of drums, means for guiding said hot film around the drums in both said groups thereof in alternating relation to present opposite sides of said film to successive said drums, a pair of endless belts substantially equal in width to the face of said drums and adapted to absorb heat from said film, means supporting said belts in pressure engagement with the exposed surfaces of the portions of said film in contact with said drums to maintain both said belts and said drums in simultaneous heat exchanging relation with opposite surfaces of said films, means for continuously advancing both said belts and said film, and means spaced from said drums for continuously reconditioning said belts to maintain predetermined temperature and humidity conditions therein increasing the heat absorbing action thereof with respect to said film.

References Cited in the file of this patent

UNITED STATES PATENTS

| Number | Name | Date |
|---|---|---|
| 947,457 | Ratignier et al. | Jan. 25, 1910 |
| 2,308,951 | Novotny et al. | Jan. 19, 1943 |
| 2,434,541 | Bierer | Jan. 13, 1948 |
| 2,536,048 | Flanagan | Jan. 2, 1951 |